United States Patent
Zeng et al.

(10) Patent No.: US 10,123,347 B2
(45) Date of Patent: Nov. 6, 2018

(54) METHOD AND APPARATUS FOR DECOUPLING UPLINK LATENCY USING COMMON UPLINK BURST IN TDD SUBFRAME STRUCTURE

(71) Applicant: QUALCOMM INCORPORATED, San Diego, CA (US)

(72) Inventors: Wei Zeng, San Diego, CA (US); Tingfang Ji, San Diego, CA (US); Joseph Binamira Soriaga, San Diego, CA (US); John Smee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 15/211,604

(22) Filed: Jul. 15, 2016

(65) Prior Publication Data
US 2017/0164391 A1    Jun. 8, 2017

Related U.S. Application Data

(60) Provisional application No. 62/263,466, filed on Dec. 4, 2015.

(51) Int. Cl.
*H04W 72/12* (2009.01)
*H04L 29/06* (2006.01)
(Continued)

(52) U.S. Cl.
CPC ....... *H04W 72/1268* (2013.01); *H04L 1/0018* (2013.01); *H04L 5/005* (2013.01);
(Continued)

(58) Field of Classification Search
None
See application file for complete search history.

(56) References Cited

U.S. PATENT DOCUMENTS 8,089,930 B2 * 1/2012 Nakatsugawa ....... H04W 74/02
370/321
8,145,224 B2   3/2012 Cho et al.
(Continued)

FOREIGN PATENT DOCUMENTS

WO    WO-2015006636 A1    1/2015

OTHER PUBLICATIONS

Devasenapathy S., et al., "Between Neighbors: Neighbor Discovery Analysis in EH-IoTs," 10th International Conference on Autonomic Computing (ICAC '13), 2013, pp. 193-200.
(Continued)

*Primary Examiner* — Hong S Cho
(74) *Attorney, Agent, or Firm* — Liem T. Do

(57) ABSTRACT

Wireless communications systems and methods related to decoupling uplink latency using common uplink (UL) burst in Time Division Duplex (TDD) sub-frame structure are disclosed. User equipment (UE) can transmit to a base station a common UL burst in each sub-frame communicated between UE and the base station, wherein he common UL burst comprises at least one of: a physical layer (PHY) acknowledgement (ACK), a scheduling request (SR), a buffer status report (BSR), or a sounding reference signal (SRS). UE can be further configured to transmit scheduled UL payload data in at least one common UL burst of at least one sub-frame communicated between the UE and the base station.

50 Claims, 8 Drawing Sheets

900

902
Receive, at a base station from a user equipment (UE), a common uplink (UL) burst in each sub-frame communicated between the UE and the base station, wherein the common UL burst comprises at least one of a physical layer (PHY) acknowledgement (ACK), a scheduling request (SR), a buffer status report (BSR), or a sounding reference signal (SRS)

904
Receive, at the base station, an UL payload data within at least one common UL burst of at least one sub-frame communicated between the UE and the base station

(51) Int. Cl.

| | | |
|---|---|---|
| *H04L 5/00* | (2006.01) | |
| *H04L 29/08* | (2006.01) | |
| *H04W 52/36* | (2009.01) | |
| *H04W 88/08* | (2009.01) | |
| *H04L 1/00* | (2006.01) | |
| *H04L 5/14* | (2006.01) | |
| *H04W 88/02* | (2009.01) | |

(52) U.S. Cl.
CPC .......... *H04L 5/0044* (2013.01); *H04L 5/0048* (2013.01); *H04L 5/0055* (2013.01); *H04L 5/14* (2013.01); *H04L 5/1469* (2013.01); *H04L 69/22* (2013.01); *H04L 69/323* (2013.01); *H04W 52/365* (2013.01); *H04W 72/1273* (2013.01); *H04W 88/02* (2013.01); *H04W 88/08* (2013.01)

(56) References Cited

U.S. PATENT DOCUMENTS

| | | | |
|---|---|---|---|
| 8,284,720 B2 | 10/2012 | Lee et al. | |
| 8,320,267 B2* | 11/2012 | Wei | H04L 25/0224 370/252 |
| 8,750,162 B2* | 6/2014 | Lee | H04L 5/0007 370/254 |
| 9,155,070 B2 | 10/2015 | Yuk et al. | |
| 9,178,772 B2 | 11/2015 | Dasgupta et al. | |
| 9,363,780 B2* | 6/2016 | Yang | H04W 52/34 |
| 2005/0232181 A1* | 10/2005 | Park | H04L 5/0007 370/319 |
| 2006/0215581 A1 | 9/2006 | Castagnoli et al. | |
| 2009/0135721 A1* | 5/2009 | Karlsson | H04W 72/10 370/235 |
| 2012/0269103 A1 | 10/2012 | Papasakellariou et al. | |
| 2013/0163506 A1* | 6/2013 | Papasakellariou | H04L 5/0007 370/315 |
| 2014/0023012 A1* | 1/2014 | Sato | H04W 72/1247 370/329 |
| 2015/0078198 A1 | 3/2015 | Estevez et al. | |
| 2015/0215097 A1 | 7/2015 | Yi et al. | |
| 2015/0271809 A1* | 9/2015 | Kato | H04W 72/1263 370/329 |
| 2017/0201967 A1* | 7/2017 | Yang | H04W 72/042 |

OTHER PUBLICATIONS

International Search Report and Written Opinion—PCT/US2016/061593—ISA/EPO—dated Feb. 1, 2017.

Toni L., et al., "Dense Small-Cell Networks: Rethinking the Radio Interface Beyond LTE-Advanced", 1st International Conference on 5G for Ubiquitous Connectivity, ICST, Nov. 26, 2014 (Nov. 26, 2014), pp. 163-169, XP032735039, DOI: 10.4108/ICST.5GU.2014.258115 [retrieved on Feb. 11, 2015].

Toni L., et al., "New Spectrally and Energy Efficient Flexible TDD Based Air Interface for 5G Small Cells," IEEE 79th Vehicular Technology Conference (VTC SPRING), May 1, 2014 (May 1, 2014), pp. 1-7, XP055186316, DOI: 10.1109/VTCSpring.2014.7023168.

Toni L., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/ACCESS.2014.2355415 [retrieved on Sep. 22, 2014].

\* cited by examiner

US 10,123,347 B2

METHOD AND APPARATUS FOR DECOUPLING UPLINK LATENCY USING COMMON UPLINK BURST IN TDD SUBFRAME STRUCTURE

CROSS REFERENCE TO RELATED APPLICATIONS

The present application claims priority to and the benefit of the U.S. Provisional Patent Application Nos. 62/263,466, filed Dec. 4, 2015, which is hereby incorporated by reference in its entirety.

TECHNICAL FIELD

This application relates to wireless communication systems, and more particularly to decoupling uplink latency using common uplink bursts in Time Division Duplex (TDD) sub-frame structures.

INTRODUCTION

Growing demand for data and throughput has been envisioned for $5^{th}$ Generation (5G) networks, which requires a broader frequency spectrum. A plethora of unpaired spectrum is available at a high frequency band, which is also less expensive than the paired spectrum at frequencies of 2 GHz and below. Wireless communications on the unpaired spectrum is typically performed in Time Division Duplex (TDD) mode, where uplink transmission (e.g., transmission from user equipment (UE) to evolved Node B (eNB)) and downlink transmission (e.g., transmission from eNB to UE) share the same frequency spectrum, but are separated in time.

BRIEF SUMMARY OF SOME EMBODIMENTS/EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method for wireless communications includes transmitting, from a user equipment (UE) to a base station (BS), a common uplink (UL) burst in each sub-frame communicated between the UE and the BS, wherein the common UL burst comprises at least one of a physical layer (PHY) acknowledgement (ACK), a scheduling request, a buffer status report (BSR), or a sounding reference signal (SRS), and transmitting, from the UE, scheduled UL payload data in at least one common UL burst of at least one sub-frame communicated between the UE and the BS.

In an additional aspect of the disclosure, an apparatus includes a transmitter configured to transmit, to another apparatus, a common uplink (UL) burst in each sub-frame communicated between the apparatus and the other apparatus, wherein the common UL burst comprises at least one of a physical layer (PHY) acknowledgement (ACK), a scheduling request (SR), a buffer status report (BSR), or a sounding reference signal (SRS), and a transmitter is further configured to transmit scheduled UL payload data in at least one common UL burst of at least one sub-frame communicated between the apparatus and the other apparatus.

In an additional aspect of the disclosure, an apparatus includes means for transmitting, to another apparatus, a common uplink (UL) burst in each sub-frame communicated between the apparatus and the other apparatus, wherein the common UL burst comprises at least one of a physical layer (PHY) acknowledgement (ACK), a scheduling request (SR), a buffer status report (BSR), or a sounding reference signal (SRS), and wherein the means for transmitting is further configured to transmit scheduled UL payload data in at least one common UL burst of at least one sub-frame communicated between the apparatus and the other apparatus.

In an additional aspect of the disclosure, a computer-readable medium having program code recorded thereon includes program code comprising code for causing a user equipment (UE) to transmit, to a base station (BS), a common uplink (UL) burst in each sub-frame communicated between the UE and the BS, wherein the common UL burst comprises at least one of a physical layer (PHY) acknowledgement (ACK), a scheduling request (SR), a buffer status report (BSR), or a sounding reference signal (SRS), and code for causing the UE to transmit scheduled UL payload data in at least one common UL burst of at least one sub-frame communicated between the UE and the BS.

In an additional aspect of the disclosure, a method for wireless communications includes receiving, at a base station (BS) from a user equipment (UE), a common uplink (UL) burst in each sub-frame communicated between the UE and the BS, wherein the common UL burst comprises at least one of a physical layer (PHY) acknowledgement (ACK), a scheduling request (SR), a buffer status report (BSR), or a sounding reference signal (SRS), and receiving, at the BS, an UL payload data within at least one common UL burst of at least one sub-frame communicated between the UE and the BS.

In an additional aspect of the disclosure, an apparatus includes a receiver configured to receive, from another apparatus, a common uplink (UL) burst in each sub-frame communicated between the other apparatus and the apparatus, wherein the common UL burst comprises at least one of a physical layer (PHY) acknowledgement (ACK), a scheduling request (SR), a buffer status report (BSR), or a sounding reference signal (SRS), and wherein the receiver is further configured to receive an UL payload data within at least one common UL burst of at least one sub-frame communicated between the other apparatus and the apparatus.

In an additional aspect of the disclosure, an apparatus includes means for receiving, from another apparatus, a common uplink (UL) burst in each sub-frame communicated between the other apparatus and the apparatus, wherein the common UL burst comprises at least one of a physical layer (PHY) acknowledgement (ACK), a scheduling request (SR), a buffer status report (BSR), or a sounding reference signal (SRS), and wherein the means for receiving is further configured to receive an UL payload data within at least one common UL burst of at least one sub-frame communicated between the other apparatus and the apparatus In an additional aspect of the disclosure, a computer-readable medium having program code recorded thereon includes program code comprising code for causing a base station (BS) to receive, from a user equipment (UE), a common uplink (UL) burst in each sub-frame communicated between the UE and the BS, wherein the common UL burst comprises at least one of a physical layer (PHY) acknowledgement (ACK), a scheduling request (SR), a buffer status report (BSR), or a sounding reference signal (SRS), and code for causing the BS to receive an UL payload data within at least one common UL burst of at least one sub-frame communicated between the UE and the BS.

Other aspects, features, and embodiments of the present disclosure will become apparent to those of ordinary skill in the art upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new (e.g., 4G networks) releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Figure 1:
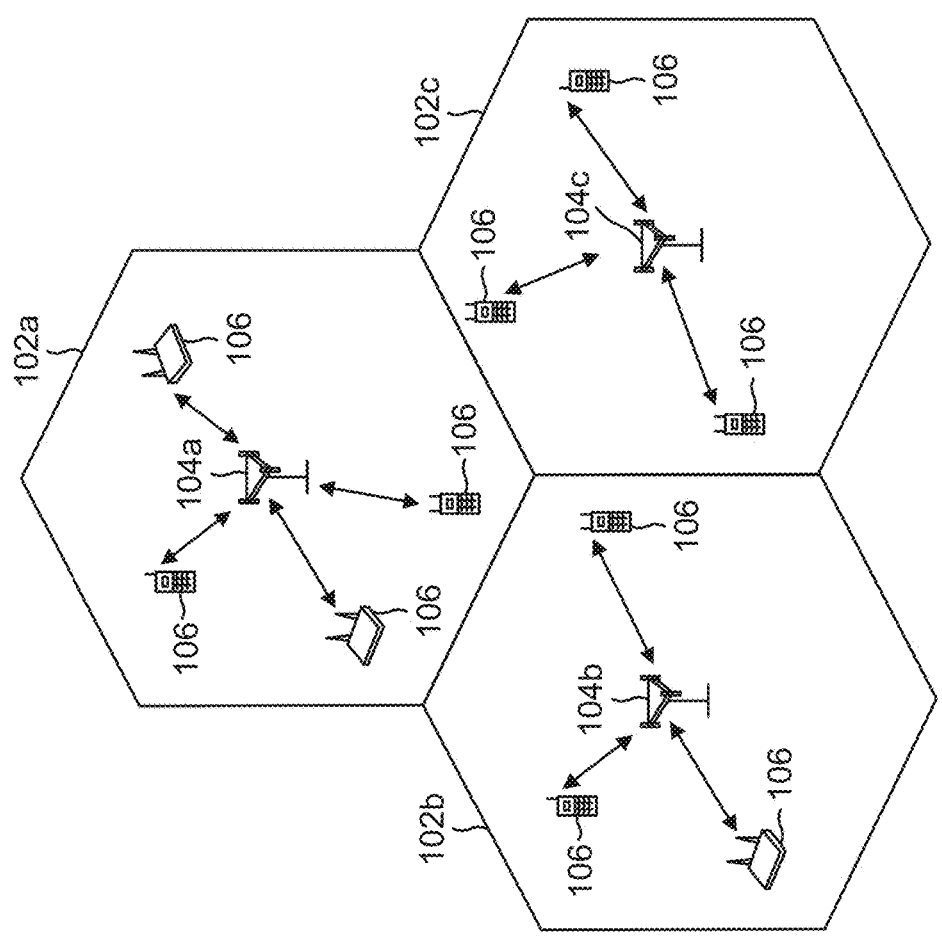
FIG. 1 is a diagram of an exemplary wireless communications environment according to embodiments of the present disclosure.

FIG. 1 illustrates a wireless communication network 100 in accordance with various aspects of the present disclosure. The wireless network 100 may include a number of base stations 104 and a number of user equipment (UE) 106, all within one or more cells 102 as illustrated in FIG. 1. For example, FIG. 1 shows base stations 104a, 104b, and 104c associated with cells 102a, 102b, and 102c, respectively. The communications environment 100 may support operation on multiple carriers (e.g., waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The communications environment 100 may be a multi-carrier LTE network capable of efficiently allocating network resources. The communications environment 100 is one example of a network to which various aspects of the disclosure apply.

A base station (BS) 104 as discussed herein can have various characteristics. In some scenarios, it may include an evolved Node B (eNodeB or eNB) in the LTE context, for example. A base station 104 may also be referred to as a base transceiver station or an access point. It will be recognized that there could be one to many base stations, as well as be an assortment of different types such as macro, pico, and/or femto base stations. The base stations 104 may communicate with each other and other network elements via one or more backhaul links. The base stations 104 communicate with the UEs 106 as shown, including via direct wireless connections or indirect, e.g., via relay devices. A UE 106 may communicate with a base station 104 via an uplink and a downlink. The downlink (or forward link) refers to the communication link from a base station 104 to a UE 106. The uplink (or reverse link) refers to the communication link from a UE 106 to a base station 104.

The UEs 106 may be dispersed throughout the wireless network 100, and each UE 106 may be stationary or mobile. A UE may also be referred to as a terminal, a mobile station, a subscriber unit, etc. A UE 106 may be a cellular phone, a smartphone, a personal digital assistant, a wireless modem, a laptop computer, a tablet computer, entertainment device, medical device/equipment, biometric devices/equipment, fitness/exercise devices, vehicular components/sensors, etc. The wireless communication network 100 is one example of a network to which various aspects of the disclosure apply.

Figure 2:
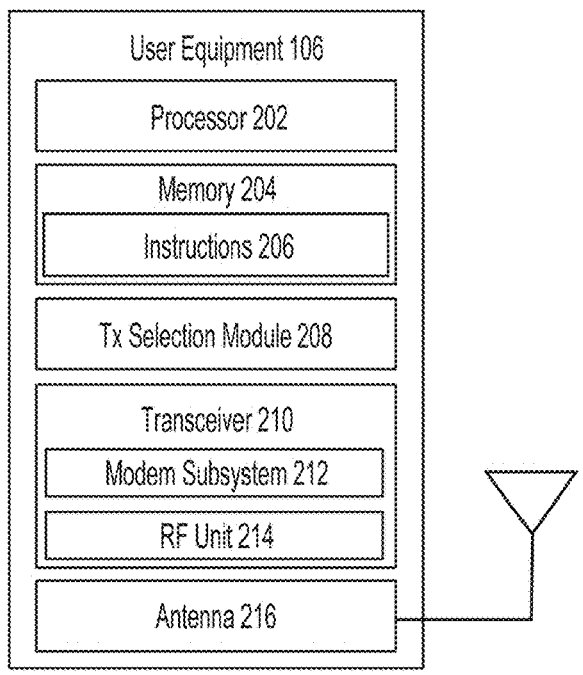
FIG. 2 is a block diagram of an exemplary user equipment (UE) according to embodiments of the present disclosure.

FIG. 2 is a block diagram of UE 106 according to embodiments of the present disclosure. The UE 106 may include a processor 202, a memory 204, a transmission access resource selection module 208, a transceiver 210, and an antenna 216. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 442), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UE 106 in connection with embodiments of the present disclosure. Instructions 206 may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements. The transmission access resource selection module 208 may be configured to select and assign resources (e.g., time resources and/or frequency resources) for transmission of uplink bursts from UE 106, discussed in more detail below.

The transceiver 210 may include a modem subsystem 212 and a radio frequency (RF) unit 214. The transceiver 210 is configured to communicate bi-directionally with other devices, such as base stations 104. The modem subsystem 212 may be configured to modulate and/or encode the data from the memory 204 and/or the transmission access resource selection module 208 (and/or from another source, such as some type of sensor) according to a modulation and coding scheme (MCS), e.g., a low-density parity check (LDPC) coding scheme, a turbo coding scheme, a convolutional coding scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a base station 104. Although shown as integrated together in transceiver 210, the modem subsystem 212 and the RF unit 214 may be separate devices that are coupled together at the UE 106 to enable the UE 106 to communicate with other devices.

The RF unit 214 may provide the modulated and/or processed data, e.g. data packets (or, more generally, data messages which may contain one or more data packets and other information), to the antenna 216 for transmission to one or more other devices. This may include, for example, transmission of data to a base station 104 according to embodiments of the present disclosure. The antenna 216 may further receive data messages transmitted from a base station 104 and provide the received data messages for processing and/or demodulation at the transceiver 210. Although FIG. 2 illustrates antenna 216 as a single antenna, antenna 216 may include multiple antennas of similar or different designs in order to sustain multiple transmission links.

Figure 3:
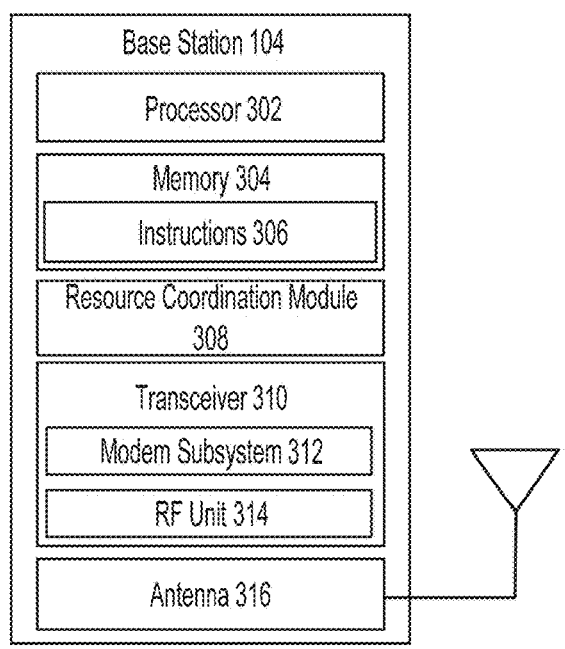
FIG. 3 is a block diagram of an exemplary base station according to embodiments of the present disclosure.

FIG. 3 is a block diagram of an exemplary base station 104 according to embodiments of the present disclosure. The base station 104 may include a processor 302, a memory 304, a resource coordination module 308, a transceiver 310, and an antenna 316. These elements may be in direct or indirect communication with each other, for example via one or more buses. The base station 104 may be an evolved Node B (eNodeB or eNB), a macro cell, a pico cell, a femto cell, a relay station, an access point, or another electronic device operable to perform the operations described herein with respect to the base station 104. The base station 104 may operate in accordance with one or more communication standards, such as a 3rd generation (3G) wireless communication standard, a 4th generation (4G) wireless communication standard, a long term evolution (LTE) wireless communication standard, an LTE-advanced wireless communication standard, or another wireless communication standard now known or later developed (e.g., a next generation network operating according to a 5G protocol).

The processor 302 may include a CPU, a DSP, an ASIC, a controller, a FPGA device, another hardware device, a firmware device, or any combination thereof configured to perform the operations described herein with reference to the base station 104 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the base station 104 in connection with embodiments of the present disclosure. Instructions 306 may also be referred to as code, which may be interpreted broadly to include any type of computer-readable statement(s) as discussed above with respect to FIG. 2. The resource coordination module 308 may be configured to coordinate resource usage (e.g., time resources and/or frequency resources) among the base stations 104 when communicating with the UEs 106, such as to mitigate or at least reduce interference among the base stations 104.

The transceiver 310 may include a modem subsystem 312 and a radio frequency (RF) unit 314. The transceiver 310 is configured to communicate bi-directionally with other devices, such as UEs 106. The modem subsystem 312 may be configured to modulate and/or encode data according to a MCS, some examples of which have been listed above with respect to FIG. 2. The RF unit 314 may be configured to process (e.g., perform analog to digital conversion or digital to analog conversion, etc.) of modulated/encoded data from the modem subsystem 312 (on outbound transmissions) or of transmissions originating from another source, such as an UE 106. Although shown as integrated together in transceiver 310, the modem subsystem 312 and the RF unit 314 may be separate devices that are coupled together at the base station 104 to enable the base station 104 to communicate with other devices.

The RF unit 314 may provide the modulated and/or processed data, e.g. data packets, to the antenna 316 for transmission to one or more other devices such as UEs 106. The modem subsystem 312 may modulate and/or encode the data in preparation for transmission. The RF unit 314 may receive the modulated and/or encoded data packet and process the data packet prior to passing it on to the antenna 316. This may include, for example, transmission of data messages to UEs 106 or to another base station 104, according to embodiments of the present disclosure. The antenna 316 may further receive data messages transmitted from UEs 106, and provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
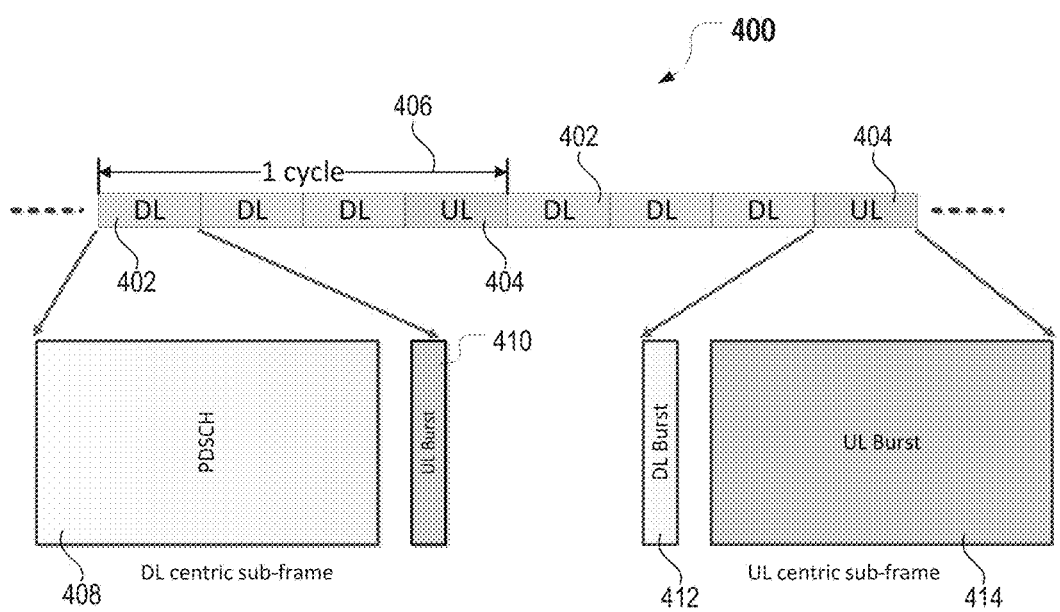
FIG. 4 is a diagram of a self-contained Time Division Duplex (TDD) sub-frame according to embodiments of the present disclosure.

FIG. 4 is a self-contained Time Division Duplex (TDD) sub-frame structure 400 with a common uplink burst design according to embodiments of the present disclosure. As illustrated in FIG. 4, the TDD sub-frame structure 400 may comprise a plurality of downlink (DL) centric sub-frames 402 and at least one uplink (UL) centric sub-frame 404 for each communication cycle 406 between eNB (e.g., eNB 104) and UE (e.g., UE 106). Each DL centric sub-frame 402 may comprise a Physical Downlink Shared Channel (PDSCH) 408 (long DL burst), and a common UL burst 410 (short UL burst). Each UL centric sub-frame 404 may comprise a short DL burst 412 and a long UL burst 414. In general, due to asymmetry between DL traffic and UL traffic, a number of DL centric sub-frames 402 per communication cycle 406 can be greater than a number of UL centric sub-frames 404. The ratio can be fixed or variable. In some instances, the number of UL centric sub-frames 404 is greater than the number of DL centric sub-frames 402. For some embodiments, each DL centric sub-frame 402 and UL centric sub-frame 404 of the TDD sub-frame structure 400 may be communicated during a transmission time interval (TTI) with duration of 0.25 ms (e.g., short sub-frame structure). In this case, each common UL burst structure (e.g., the common UL burst 412, and the common UL burst 418) may comprise, for example, two short orthogonal frequency division multiplexing (OFDM) symbols having duration of approximately 33 μs (e.g., for sub-carrier spacing of 60 kHz). It is understood that the frame structure and associated lengths of time of TTIs, PDSCHs, DL bursts, UL bursts, and/or common UL bursts may vary.

Embodiments of the present disclosure relate to decoupling uplink control latency from the UL/DL switching pattern using common UL burst. There may be several UL channels with time critical information. For some embodiments, a Physical layer (PHY) Acknowledgement (ACK) or a Negative Acknowledgement (NACK) in DL centric sub-frames 402 may be time critical information. The ACK/NACK may be transmitted to acknowledge (or negatively acknowledge) DL data sent on PDSCH. The objective may be to transmit ACK/NACK within the same sub-frame as the PDSCH (achieving self-contained) in to reduce Hybrid Automatic Repeat Request (HARQ) delay.

For some embodiments, a Scheduling Request (SR) bit may be time critical information. The SR bit may indicate a request for the eNB to provide UL grant so that the UE can transmit Physical Uplink Shared Channel (PUSCH). The objective may be to transmit SR from the UE to the eNB in either DL centric sub-frame 402 or in UL centric sub-frame 404 in order to avoid extra latency in waiting for UL centric sub-frame 404. In one or more embodiments, SR may also include information about Buffer Status Report (BSR) at the UE. The BSR may provide a serving eNB with information about an amount of data available for transmission in UL buffers of the UE.

For some embodiments, a Sounding Reference Signal (SRS) may be time critical information. The SRS transmitted from the UE to the eNB may allow the eNB to quickly sound a channel between the eNB and the UE whenever there is a DL traffic. The SRS received at the eNB may also allow the eNB to closely track the channel fading. Preferably, the SRS may be received by the eNB immediately before the DL burst is transmitted from the eNB to the UE. As discussed, these time critical information (e.g., at least one of ACK, NACK, SR, BSR, or SRS) should be transmitted regardless of UL-centric or DL-centric sub-frames.

Figure 5:
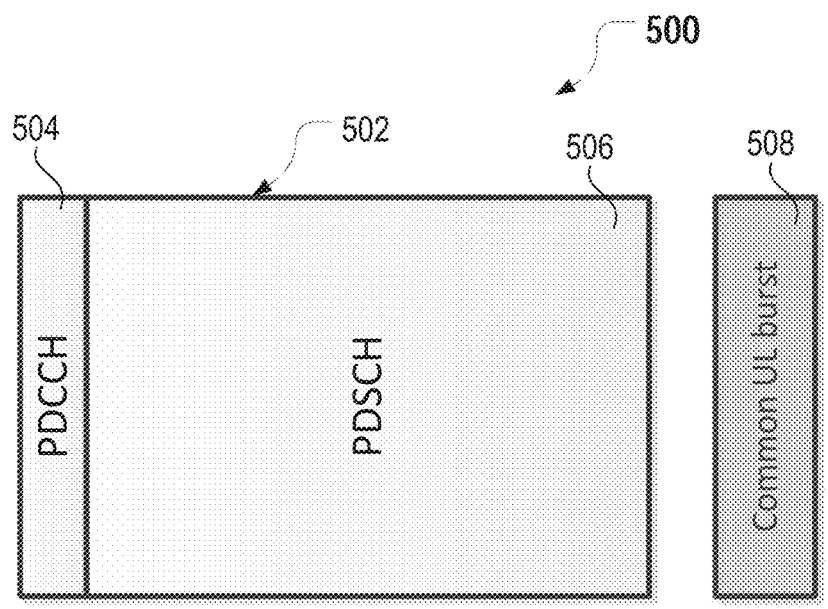
FIG. 5 is a diagram illustrating a structure of a common uplink (UL) burst across different sub-frame types according to embodiments of the present disclosure.
Figure 5:
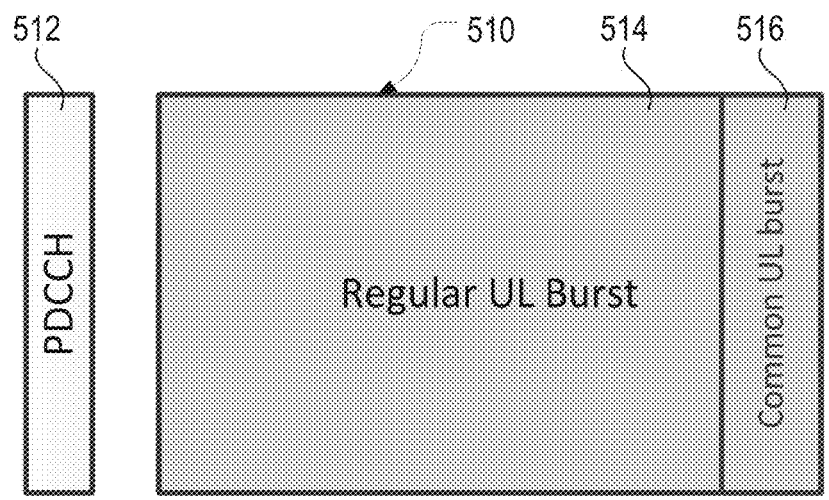

FIG. 5 is a diagram 500 illustrating common UL burst across different sub-frame types according to embodiments of the present disclosure. As illustrated in FIG. 5, each DL centric sub-frame 502 may comprise a Physical Downlink Control Channel (PDCCH) 504, a Physical Downlink Shared Channel (PDSCH) 506, and a common UL burst 508. Each UL centric sub-frame 510 may comprise a PDCCH 512, a regular UL burst 514, and a common UL burst 516. It can be observed that the same common UL burst structure may be present in both the DL centric sub-frames and the UL centric sub-frames, e.g., the common UL bursts 508 and 516 may comprise the same structure incorporated into each DL centric sub-frame 502 and each UL centric sub-frame 510.

As illustrated in FIG. 5, the common UL burst may be present in all sub-frames. DL-centric sub-frames may comprise (beside DL channels) only the common UL burst (e.g., the common UL burst 508), whereas UL-centric sub-frames may comprise both the regular UL burst (e.g., regular UL burst 514 in FIG. 5) and the common UL burst (e.g., the common UL burst 516). In an embodiment of the present disclosure, the common UL burst in all sub-frames may occupy the same frequency/time resources within the network.

In accordance with embodiments of the present disclosure, time critical UL control information may be transmitted in a common UL burst of either DL centric sub-frame (e.g., in common UL burst 508) or UL centric sub-frame (e.g., in common UL burst 516). For some embodiments, as discussed, time critical UL control information may comprise at least one of PHY ACK/NACK, SR, BSR, or SRS.

For some embodiments, a UE can opportunistically send Physical Uplink Shared Channel (PUSCH) data depending on available uplink headroom. This may be applicable to small cell or macro cell center users. In accordance with embodiments of the present disclosure, a common UL burst (e.g., in either DL centric sub-frame or UL centric sub-frame) may be used, by a UE, to transmit scheduled uplink payload data (e.g., PUSCH) in order to achieve low latency. Therefore, low latency uplink data may be communicated between the UE and the eNB using the common UL burst.

Certain applications have requirements on a tolerable delay for uplink data. For example, in order to support high Transmission Control Protocol (TCP) throughput in downlink, application layer ACK may need to be transmitted within a short time window. Users with enough power headroom may utilize a common UL burst to transmit the low latency uplink data. This may be applicable to small cells or cell users in large cells. For some embodiments, those UEs that want to use common uplink burst to transmit payload data need to transmit an appropriate request to the eNB. Then, the eNB may schedule, based upon the received request, transmission of UL payload data in common UL bursts based on the UE's power headroom and resource availability.

Figure 6:
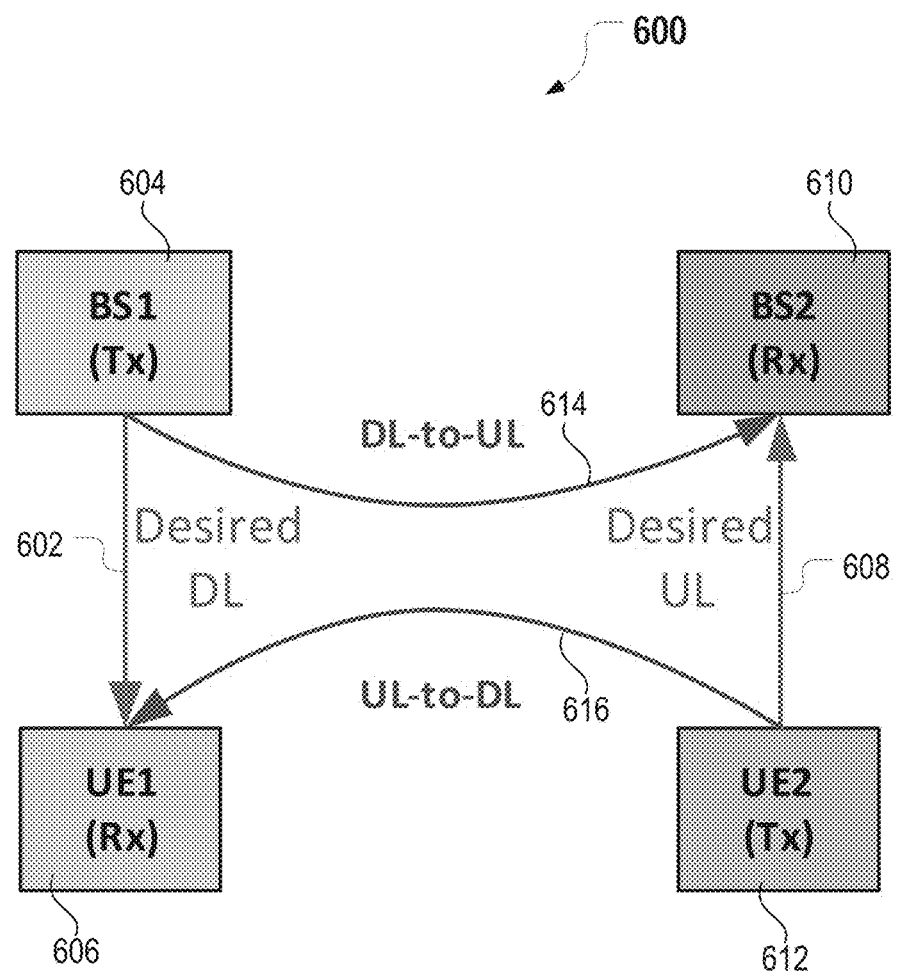
FIG. 6 is a diagram of an example communication causing mixed interference among different cells according to embodiments of the present disclosure.

For certain embodiments of the present disclosure, common UL bursts may be utilized to achieve communications free of mixed interference, or at least with reduced mixed interference. FIG. 6 is a diagram 600 of an example communication causing mixed interference among different cells according to embodiments of the present disclosure. For some embodiments, the eNB can potentially change communication of some scheduled DL-centric sub-frames into UL-centric sub-frames (and vice versa) within a cell, depending on traffic needs. This dynamic DL-UL switching may cause mixed interference among different cells. For example, as illustrated in FIG. 6, DL transmission 602 of base station 604 may interfere with UL communication 608 received at base station 610 (e.g., DL-to-UL interference 614 occurring at base station 604 and base station 610 of different cells). In the same time, UL transmission 608 from UE 612 may interfere with DL communication 602 at UE 606 (e.g., UL-to-DL interference 616 occurring at UE 606 and UE 612 of different cells). In accordance with embodiments of the present disclosure, common uplink design may allow the uplink control information to be communicated without causing mixed interference during dynamic UL-DL switching.

Figure 7:
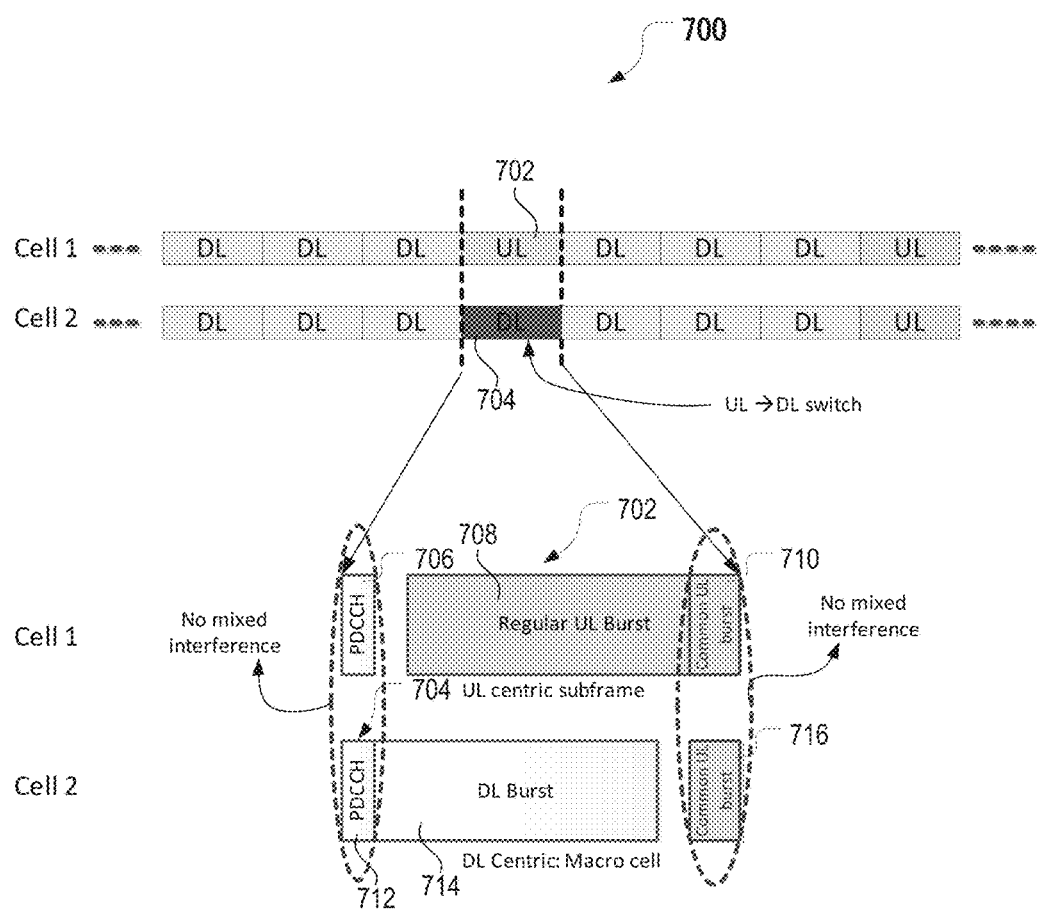
FIG. 7 is a diagram illustrating TDD communication among different cells for avoiding mixed interference according to embodiments of the present disclosure.

FIG. 7 is a structure 700 illustrating TDD communication among different cells for avoiding mixed interference according to embodiments of the present disclosure. As illustrated in FIG. 7, in Cell 2, UL-to-DL switching may occur (e.g., due to certain traffic needs), and there may be simultaneous communication of UL centric sub-frame 702 in Cell 1 and DL centric sub-frame 704 in Cell 2. The UL centric sub-frame 702 may comprise PDCCH 706, regular UL burst 708, and common UL burst 710, whereas DL centric sub-frame 704 may comprise PDCCH 712, DL burst 714, and common UL burst 716, as illustrated in FIG. 7. It can be observed that there is no mixed interference between PDCCH 706 and PDCCH 712 since each PDCCH can be decoded based on a unique spreading sequence (e.g., PDCCH 706 and PDCCH 712 can be orthogonal to each other). Similarly, there is no mixed interference between common UL burst 710 and common UL burst 716 since each common UL burst can be spread with a unique spreading sequence (e.g., common UL burst 710 and common UL burst 716 can be orthogonal to each other).

Figure 8:
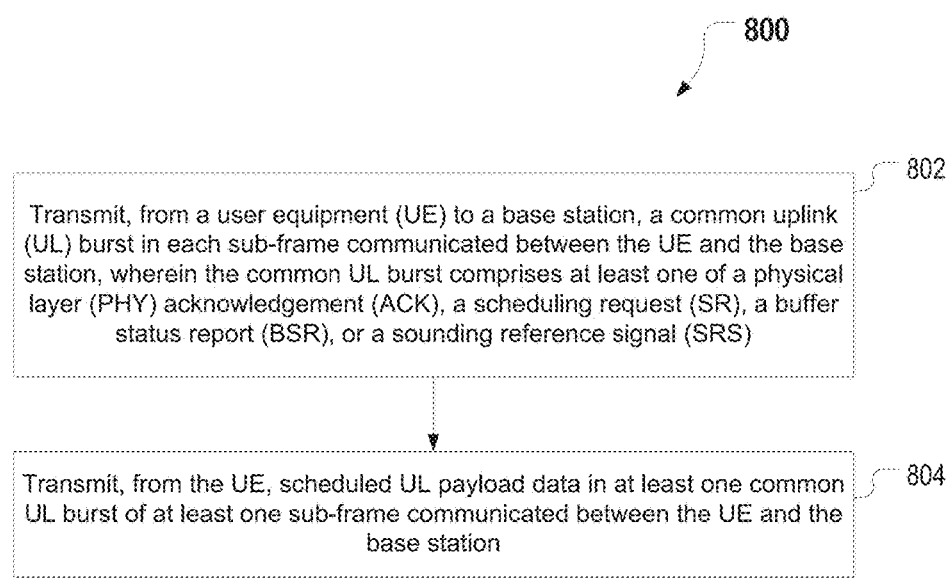
FIG. 8 is a flowchart illustrating an exemplary method for wireless communications that may be performed by a user equipment (UE) according to embodiments of the present disclosure.

FIG. 8 is a flowchart illustrating an exemplary method 800 for according to embodiments of the present disclosure. The method 800 may be implemented in UE 106. The method 800 will be described with respect to a single UE 106 for simplicity of discussion, though it will be recognized that the aspects described herein may be applicable to a plurality of UEs 106, including a network of UEs. It is understood that additional method blocks can be provided before, during, and after the blocks of method 800, and that some of the blocks described can be replaced or eliminated for other embodiments of the method 800.

At block 802, UE may transmit, to a base station, a common UL burst (e.g., common UL burst 508 from FIG. 5, common UL burst 516 from FIG. 5) in each sub-frame (e.g., DL centric sub-frame 502 from FIG. 5, UL centric sub-frame 510 from FIG. 5) communicated between the UE and the base station, wherein the common UL burst comprises at least one of PHY ACK, SR, BSR, or SRS. At block 804, the UE may transmit scheduled UL payload data in at least one common UL burst (e.g., at least one of common UL burst 508 or common UL burst 516 from FIG. 5) of at least one sub-frame (e.g., at least one of DL centric sub-frame 502 or UL centric sub-frame 510 from FIG. 5) communicated between the UE and the base station.

Figure 9:
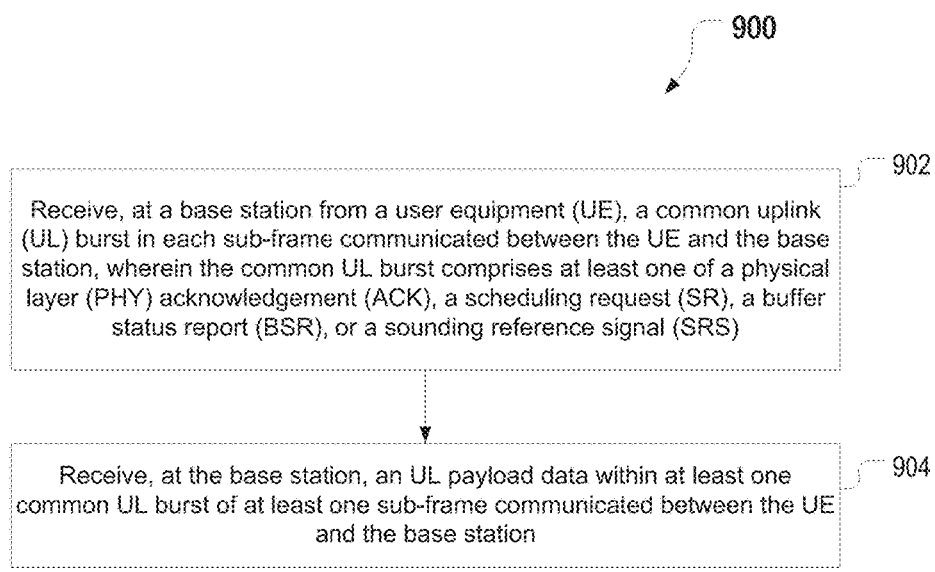
FIG. 9 is a flowchart illustrating an exemplary method for wireless communications that may be performed by a base station (BS) according to embodiments of the present disclosure.

FIG. 9 is a flowchart illustrating an exemplary method 900 for according to embodiments of the present disclosure. The method 900 may be implemented in the base station 104. The method 900 will be described with respect to a single base station 104 in communication with a single UE 106 for simplicity of discussion, though it will be recognized that the aspects described herein may be applicable to a plurality of UEs 106 and/or base stations 104. It is understood that additional method blocks can be provided before, during, and after the blocks of method 900, and that some of the blocks described can be replaced or eliminated for other embodiments of the method 900.

At block 902, a base station may receive, from UE, a common UL burst (e.g., common UL burst 508 from FIG. 5, common UL burst 516 from FIG. 5) in each sub-frame (e.g., DL centric sub-frame 502 from FIG. 5, UL centric sub-frame 510 from FIG. 5) communicated between the UE and the base station, wherein the common UL burst comprises at least one of PHY ACK, SR, BSR, or SRS. At block 904, the base station may receive an UL payload data within at least one common UL burst (e.g., at least one of common UL burst 508 or common UL burst 516 from FIG. 5) of at least one sub-frame (e.g., at least one of DL centric sub-frame 502 or UL centric sub-frame 510 from FIG. 5) communicated between the UE and the base station.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communications, comprising:
receiving, at a base station (BS) from a user equipment (UE), a common uplink (UL) burst in each sub-frame communicated between the UE and the BS, wherein the common UL burst comprises at least one of a physical layer (PHY) acknowledgement (ACK), a scheduling request (SR), a buffer status report (BSR), or a sounding reference signal (SRS);
receiving, at the BS, an UL payload data within at least one common UL burst of at least one sub-frame communicated between the UE and the BS; and
switching, by the BS based on a traffic, communication of a scheduled UL centric sub-frame to communication of a downlink (DL) centric sub-frame having a Physical Downlink Control Channel (PDCCH) and the common UL burst.

2. The method of claim 1, wherein receiving the common UL burst in each sub-frame comprises:
receiving the common UL burst in each downlink (DL) centric sub-frame and each UL centric sub-frame communicated between the UE and the BS.

3. The method of claim 1, further comprising:
transmitting, from the BS, downlink (DL) data in a Physical Downlink Shared Channel (PDSCH) of the sub-frame; and
receiving, at the BS from the UE in response to the DL data, the PHY ACK in the common UL burst of the sub-frame.

4. The method of claim 1, further comprising:
receiving, at the BS, at least one of the SR or the BSR in the common UL burst of the sub-frame; and
scheduling, by the BS, transmission of downlink (DL) data based on the at least one of the SR or the BSR.

5. The method of claim 1, further comprising:
receiving, at the BS, the SRS within the common UL burst of the sub-frame before transmitting a downlink (DL) burst to the UE; and
sounding, by the BS, a channel between the BS and the UE based on the received SRS.

6. The method of claim 5, further comprising:
tracking, by the BS, fading of the channel between the BS and the UE based on the received SRS.

7. The method of claim 1, wherein receiving the UL payload data comprises:
receiving the UL payload data within the at least one common UL burst of at least one downlink (DL) centric sub-frame or at least one UL centric sub-frame communicated between the UE and the BS.

8. The method of claim 1, further comprising:
receiving, at the BS, a request for transmission of the UL payload data from the UE; and
scheduling, by the BS in response to the request, transmission of the UL payload data based on at least one of a power headroom of the UE or an availability of resources associated with the BS.

9. The method of claim 8, wherein receiving the UL payload data comprises:
receiving a Physical Uplink Shared Channel (PUSCH) data based on the at least one of the power headroom of the UE or the availability of resources associated with the BS.

10. The method of claim 9, further comprising:
communicating, by the BS, the DL centric sub-frame having the PDCCH and the common UL burst simultaneously with communicating, by another BS, another UL centric sub-frame having another PDCCH and another common UL burst.

11. An apparatus, comprising:
a receiver configured to receive, from another apparatus, a common uplink (UL) burst in each sub-frame communicated between the other apparatus and the apparatus, wherein
the common UL burst comprises at least one of a physical layer (PHY) acknowledgement (ACK), a scheduling request (SR), a buffer status report (BSR), or a sounding reference signal (SRS), and wherein the receiver is further configured to
receive an UL payload data within at least one common UL burst of at least one sub-frame communicated between the other apparatus and the apparatus; and
a processor configured to switch based on a traffic, communication of a scheduled UL centric sub-frame to communication of a downlink (DL) centric sub-frame having a Physical Downlink Control Channel (PDCCH) and the common UL burst.

12. The apparatus of claim 11, wherein the receiver is further configured to:
receive the common UL burst in each downlink (DL) centric sub-frame and each UL centric sub-frame communicated between the other apparatus and the apparatus.

13. The apparatus of claim 11, further comprising:
a transmitter configured to transmit downlink (DL) data in a Physical Downlink Shared Channel (PDSCH) of the sub-frame, wherein the receiver is further configured to receive, from the other apparatus in response to the DL data, the PHY ACK in the common UL burst of the sub-frame.

14. The apparatus of claim 11, wherein the receiver is further configured to:
receive at least one of the SR or the BSR in the common UL burst of the sub-frame, and the apparatus further comprising
a processor configured to schedule transmission of downlink (DL) data based on the at least one of the SR or the BSR.

15. The apparatus of claim 11, wherein the receiver is further configured to:
receive the SRS within the common UL burst of the sub-frame before transmitting a downlink (DL) burst to the other apparatus, and the apparatus further comprising
a processor configured to sound a channel between the apparatus and the other apparatus based on the received SRS.

16. An apparatus, comprising:
means for receiving, from another apparatus, a common uplink (UL) burst in each sub-frame communicated between the other apparatus and the apparatus, wherein
the common UL burst comprises at least one of a physical layer (PHY) acknowledgement (ACK), a scheduling request (SR), a buffer status report (BSR), or a sounding reference signal (SRS), and
wherein the means for receiving further comprise means for receiving an UL payload data within at least one common UL burst of at least one sub-frame communicated between the other apparatus and the apparatus; and
means for switching based on a traffic, communication of a scheduled UL centric sub-frame to communication of a downlink (DL) centric sub-frame having a Physical Downlink Control Channel (PDCCH) and the common UL burst.

17. The apparatus of claim 16, wherein the means for receiving:
further comprise means for receiving the common UL burst in each downlink (DL) centric sub-frame and each UL centric sub-frame communicated between the other apparatus and the apparatus.

18. The apparatus of claim 16, further comprising:
means for transmitting downlink (DL) data in a Physical Downlink Shared Channel (PDSCH) of the sub-frame, wherein the means for receiving further comprise means for receiving from the other apparatus in response to the DL data, the PHY ACK in the common UL burst of the sub-frame.

19. The apparatus of claim 16, wherein the means for receiving further comprise means for receiving at least one of the SR or the BSR in the common UL burst of the sub-frame, and the apparatus further comprises
means for scheduling transmission of downlink (DL) data based on the at least one of the SR or the BSR.

20. The apparatus of claim 16, wherein the means for receiving
further comprise means for receiving the SRS within the common UL burst of the sub-frame before transmitting a downlink (DL) burst to the other apparatus, and the apparatus further comprises means for sounding a channel between the apparatus and the other apparatus based on the received SRS.

21. A computer-readable medium having program code recorded thereon, the program code comprising:
code for causing a base station (BS) to receive, from a user equipment (UE), a common uplink (UL) burst in each sub-frame communicated between the UE and the BS, wherein
the common UL burst comprises at least one of a physical layer (PHY) acknowledgement (ACK), a scheduling request (SR), a buffer status report (BSR), or a sounding reference signal (SRS); and
code for causing the BS to receive an UL payload data within at least one common UL burst of at least one sub-frame communicated between the UE and the BS; and
code for causing the BS to switch based on a traffic, communication of a scheduled UL centric sub-frame to communication of a downlink (DL) centric sub-frame having a Physical Downlink Control Channel (PDCCH) and the common UL burst.

22. The computer-readable medium of claim 21, further comprising:
code for causing the BS to receive the common UL burst in each downlink (DL) centric sub-frame and each UL centric sub-frame communicated between the UE and the BS.

23. The computer-readable medium of claim 21, further comprising:
code for causing the BS to transmit downlink (DL) data in a Physical Downlink Shared Channel (PDSCH) of the sub-frame; and
code for causing the BS to receive, from the UE in response to the DL data, the PHY ACK in the common UL burst of the sub-frame.

24. The computer-readable medium of claim 21, further comprising:
code for causing the BS to receive at least one of the SR or the BSR in the common UL burst of the sub-frame; and
code for causing the BS to schedule transmission of downlink (DL) data based on the at least one of the SR or the BSR.

25. The computer-readable medium of claim 21, further comprising:
code for causing the BS to receive the SRS within the common UL burst of the sub-frame before transmitting a downlink (DL) burst to the UE; and
code for causing the BS to sound a channel between the BS and the UE based on the received SRS.

26. A method for wireless communications, comprising:
receiving, at a base station (BS) from a user equipment (UE), a common uplink (UL) burst in a sub-frame communicated between the UE and the BS, wherein
the common UL burst comprises at least one of a physical layer (PHY) acknowledgement (ACK), a scheduling request (SR), a buffer status report (BSR), or a sounding reference signal (SRS);
receiving, at the BS, an UL payload data within at least one common UL burst of at least one sub-frame communicated between the UE and the BS; and
switching, by the BS based on a traffic, communication of a scheduled UL centric sub-frame to communication of a downlink (DL) centric sub-frame having a Physical Downlink Control Channel (PDCCH) and the common UL burst.

27. The method of claim 26, wherein receiving the common UL burst in the sub-frame comprises:
receiving the common UL burst in the downlink (DL) centric sub-frame and the UL centric sub-frame communicated between the UE and the BS.

28. The method of claim 26, further comprising:
transmitting, from the BS, downlink (DL) data in a Physical Downlink Shared Channel (PDSCH) of the sub-frame; and
receiving, at the BS from the UE in response to the DL data, the PHY ACK in the common UL burst of the sub-frame.

29. The method of claim 26, further comprising:
receiving, at the BS, at least one of the SR or the BSR in the common UL burst of the sub-frame; and
scheduling, by the BS, transmission of downlink (DL) data based on the at least one of the SR or the BSR.

30. The method of claim 26, further comprising:
receiving, at the BS, the SRS within the common UL burst of the sub-frame before transmitting a downlink (DL) burst to the UE; and
sounding, by the BS, a channel between the BS and the UE based on the received SRS.

31. The method of claim 30, further comprising:
tracking, by the BS, fading of the channel between the BS and the UE based on the received SRS.

32. The method of claim 26, wherein receiving the UL payload data comprises:
receiving the UL payload data within the at least one common UL burst of at least one downlink (DL) centric sub-frame or at least one UL centric sub-frame communicated between the UE and the BS.

33. The method of claim 26, further comprising:
receiving, at the BS, a request for transmission of the UL payload data from the UE; and
scheduling, by the BS in response to the request, transmission of the UL payload data based on at least one of a power headroom of the UE or an availability of resources associated with the BS.

34. The method of claim 33, wherein receiving the UL payload data comprises:
receiving a Physical Uplink Shared Channel (PUSCH) data based on the at least one of the power headroom of the UE or the availability of resources associated with the BS.

35. The method of claim 34, further comprising:
communicating, by the BS, the DL centric sub-frame having the PDCCH and the common UL burst simultaneously with communicating, by another BS, another UL centric sub-frame having another PDCCH and another common UL burst.

36. An apparatus, comprising:
a receiver configured to receive, from another apparatus, a common uplink (UL) burst in a sub-frame communicated between the other apparatus and the apparatus, wherein
the common UL burst comprises at least one of a physical layer (PHY) acknowledgement (ACK), a scheduling request (SR), a buffer status report (BSR), or a sounding reference signal (SRS), and wherein the receiver is further configured to
receive an UL payload data within at least one common UL burst of at least one sub-frame communicated between the other apparatus and the apparatus; and
a processor configured to switch based on a traffic, communication of a scheduled UL centric sub-frame to communication of a downlink (DL) centric sub-frame having a Physical Downlink Control Channel (PDCCH) and the common UL burst.

37. The apparatus of claim 36, wherein the receiver is further configured to:
receive the common UL burst in a downlink (DL) centric sub-frame and a UL centric sub-frame communicated between the other apparatus and the apparatus.

38. The apparatus of claim 36, further comprising:
a transmitter configured to transmit downlink (DL) data in a Physical Downlink Shared Channel (PDSCH) of the sub-frame, wherein the receiver is further configured to
receive, from the other apparatus in response to the DL data, the PHY ACK in the common UL burst of the sub-frame.

39. The apparatus of claim 36, wherein the receiver is further configured to:
receive at least one of the SR or the BSR in the common UL burst of the sub-frame, and the apparatus further comprising
a processor configured to schedule transmission of downlink (DL) data based on the at least one of the SR or the BSR.

40. The apparatus of claim 36, wherein the receiver is further configured to:
receive the SRS within the common UL burst of the sub-frame before transmitting a downlink (DL) burst to the other apparatus, and the apparatus further comprising
a processor configured to sound a channel between the apparatus and the other apparatus based on the received SRS.

41. An apparatus, comprising:
means for receiving, from another apparatus, a common uplink (UL) burst in a sub-frame communicated between the other apparatus and the apparatus, wherein
the common UL burst comprises at least one of a physical layer (PHY) acknowledgement (ACK), a scheduling request (SR), a buffer status report (BSR), or a sounding reference signal (SRS), and
wherein the means for receiving further comprise means for receiving an UL payload data within at least one common UL burst of at least one sub-frame communicated between the other apparatus and the apparatus; and
means for switching based on a traffic, communication of a scheduled UL centric sub-frame to communication of a downlink (DL) centric sub-frame having a Physical Downlink Control Channel (PDCCH) and the common UL burst.

42. The apparatus of claim 41, wherein the means for receiving:
further comprise means for receiving the common UL burst in the downlink (DL) centric sub-frame and the UL centric sub-frame communicated between the other apparatus and the apparatus.

43. The apparatus of claim 41, further comprising:
means for transmitting downlink (DL) data in a Physical Downlink Shared Channel (PDSCH) of the sub-frame, wherein the means for receiving further comprise means for receiving from the other apparatus in response to the DL data, the PHY ACK in the common UL burst of the sub-frame.

44. The apparatus of claim 41, wherein the means for receiving further comprise means for receiving at least one of the SR or the BSR in the common UL burst of the sub-frame, and the apparatus further comprises means for scheduling transmission of downlink (DL) data based on the at least one of the SR or the BSR.

45. The apparatus of claim 41, wherein the means for receiving further comprise means for receiving the SRS within the common UL burst of the sub-frame before transmitting a downlink (DL) burst to the other apparatus, and the apparatus further comprises means for sounding a channel between the apparatus and the other apparatus based on the received SRS.

46. A computer-readable medium having program code recorded thereon, the program code comprising:

code for causing a base station (BS) to receive, from a user equipment (UE), a common uplink (UL) burst in a sub-frame communicated between the UE and the BS, wherein the common UL burst comprises at least one of a physical layer (PHY) acknowledgement (ACK), a scheduling request (SR), a buffer status report (BSR), or a sounding reference signal (SRS); and code for causing the BS to receive an UL payload data within at least one common UL burst of at least one sub-frame communicated between the UE and the BS; and code for causing the BS to switch based on a traffic, communication of a scheduled UL centric sub-frame to communication of a downlink (DL) centric sub-frame having a Physical Downlink Control Channel (PDCCH) and the common UL burst.

47. The computer-readable medium of claim 46, further comprising:

code for causing the BS to receive the common UL burst in a downlink (DL) centric sub-frame and a UL centric sub-frame communicated between the UE and the BS.

48. The computer-readable medium of claim 46, further comprising:

code for causing the BS to transmit downlink (DL) data in a Physical Downlink Shared Channel (PDSCH) of the sub-frame; and code for causing the BS to receive, from the UE in response to the DL data, the PHY ACK in the common UL burst of the sub-frame.

49. The computer-readable medium of claim 46, further comprising:

code for causing the BS to receive at least one of the SR or the BSR in the common UL burst of the sub-frame; and code for causing the BS to schedule transmission of downlink (DL) data based on the at least one of the SR or the BSR.

50. The computer-readable medium of claim 46, further comprising:

code for causing the BS to receive the SRS within the common UL burst of the sub-frame before transmitting a downlink (DL) burst to the UE; and code for causing the BS to sound a channel between the BS and the UE based on the received SRS.

* * * * *